(12) United States Patent
Brown et al.

(10) Patent No.: US 8,089,568 B1
(45) Date of Patent: Jan. 3, 2012

(54) METHOD OF AND SYSTEM FOR PROVIDING A HEAD UP DISPLAY (HUD)

(75) Inventors: Robert D. Brown, Lake Oswego, OR (US); Robert B. Wood, Beaverton, OR (US); Kurt A. Stahl, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 280 days.

(21) Appl. No.: 12/573,021

(22) Filed: Oct. 2, 2009

(51) Int. Cl.
*G02F 1/1335* (2006.01)

(52) U.S. Cl. ............................................ 349/11; 349/96
(58) Field of Classification Search .................... 349/11, 349/13, 14, 15, 9, 67, 96
See application file for complete search history.

(56) References Cited

U.S. PATENT DOCUMENTS

| | | | |
|---|---|---|---|
| 4,582,389 A | 4/1986 | Wood et al. | |
| 4,655,540 A | 4/1987 | Wood et al. | |
| 4,669,810 A | 6/1987 | Wood | |
| 4,763,990 A | 8/1988 | Wood | |
| 4,775,218 A | 10/1988 | Wood et al. | |
| 4,842,389 A | 6/1989 | Wood et al. | |
| 4,936,642 A | 6/1990 | Hung et al. | |
| 4,948,975 A | 8/1990 | Erwin et al. | |
| 4,961,625 A | 10/1990 | Wood et al. | |
| 5,138,469 A | 8/1992 | Wood et al. | |
| 5,231,379 A | 7/1993 | Wood et al. | |
| 5,313,292 A | 5/1994 | Wood et al. | |
| 5,710,668 A | 1/1998 | Gohman et al. | |
| 6,111,701 A | 8/2000 | Brown | |
| 6,236,511 B1 | 5/2001 | Brown | |
| 6,343,863 B1 | 2/2002 | Wood | |
| 6,419,365 B1 | 7/2002 | Potekev et al. | |
| 6,486,997 B1 * | 11/2002 | Bruzzone et al. | 359/247 |
| 6,517,210 B2 | 2/2003 | Peterson et al. | |
| 6,567,014 B1 | 5/2003 | Hansen et al. | |
| 6,575,603 B2 | 6/2003 | Stahl et al. | |
| 6,661,475 B1 | 12/2003 | Stahl et al. | |
| 6,688,747 B2 | 2/2004 | Wichner et al. | |
| 6,721,096 B2 * | 4/2004 | Bruzzone et al. | 359/489.09 |
| 6,801,362 B1 | 10/2004 | Brown | |
| 6,937,377 B1 | 8/2005 | Brown et al. | |
| 6,988,806 B2 | 1/2006 | Slobodin et al. | |
| 7,072,003 B2 | 7/2006 | Stahl et al. | |
| 7,089,092 B1 | 8/2006 | Wood et al. | |
| 7,196,329 B1 | 3/2007 | Wood et al. | |
| 7,347,559 B2 | 3/2008 | Stahl et al. | |
| 7,350,939 B2 | 4/2008 | Stahl | |
| 7,355,179 B1 | 4/2008 | Wood et al. | |
| 7,360,899 B2 * | 4/2008 | McGuire et al. | 353/20 |
| 7,375,772 B2 | 5/2008 | Stahl et al. | |

(Continued)

*Primary Examiner* — Brian Healy
(74) *Attorney, Agent, or Firm* — Donna P. Suchy; Daniel M. Barbieri

(57) ABSTRACT

A head up display (HUD) includes an image source, a first lens, a second lens, a focusing mirror, a polarizing beam splitter, a second beam splitter and a combiner. The first lens is disposed between the image source and polarizing beam splitter. The second lens is disposed between the polarizing beam splitter and the second beam splitter. The polarizing beam splitter is disposed between the first lens, the mirror, and the second lens. The optical system for the HUD forms an intermediate image between the second lens and the second beam splitter. The intermediate image is located at the focal point of the curved combiner, and therefore the curved combiner collimates the display light upon reflection. The HUD can be compact and have a wide field of view.

20 Claims, 4 Drawing Sheets

U.S. PATENT DOCUMENTS

| | | |
|---|---|---|
| 7,407,296 B2 | 8/2008 | Stahl et al. |
| 7,605,774 B1 | 10/2009 | Brandt et al. |
| 7,617,022 B1 | 11/2009 | Wood et al. |
| 8,000,020 B2 * | 8/2011 | Amitai ............ 359/633 |
| 2008/0278812 A1 * | 11/2008 | Amitai ............ 359/487 |

* cited by examiner

METHOD OF AND SYSTEM FOR PROVIDING A HEAD UP DISPLAY (HUD)

FIELD OF THE INVENTION

The present specification relates to display. More particularly, the present specification relates to a head up display (HUD).

Compact HUDs are needed for small business jets and other aircraft where space is constrained in the cockpit. Proposals have been made to use substrate guided HUDs to maintain pupil expansion with a small single piece combiner assembly. However, such systems have faced difficulties in design.

Therefore, there is a need for a compact HUD for small aircraft, such as small business jets. Further, there is a need for a compact HUD which reduces stowage and break-away issues. Yet further, there is a need for a HUD that allows easy ingress/egress. Yet further still, there is also a need for a lightweight, lower cost, smaller size HUD. Even further, there is a need for a compact, wide field of view HUD.

SUMMARY OF THE INVENTION

An exemplary embodiment relates to a head up display comprising an image source, a first lens, a second lens, a polarizing beam splitter and a mirror, a first beam splitter and a combiner. The first lens is disposed between the image source and polarizing beam splitter. The second lens is disposed between the polarizing beam splitter and the first beam splitter. The first optical axis of the first lens is at an angle with respect to a second optical axis of the second lens. The combiner has a curved, partially reflective surface positioned to receive light from the first beam splitter.

Another exemplary embodiment relates to a method of providing information to a pilot. The method includes providing light associated with the information through a first lens and a polarizing beam splitter to a mirror, and back through the polarizing beam splitter to a second lens and providing the light from the second lens to a first beam splitter and from the first beam splitter to a combiner. The combiner has a partially reflective surface positioned to receive light from the first beam splitter.

Another embodiment related to an optical system for a head up display including an image source. The optical system including a first lens, a first beam splitter, a second lens, a mirror, a second beam splitter, and a combiner. The first beam splitter is disposed between the first lens and the second lens. The second beam splitter is disposed between the second lens and the combiner. The combiner has a curved partially reflective surface positioned to receive light from the second beam splitter.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Figure 1:
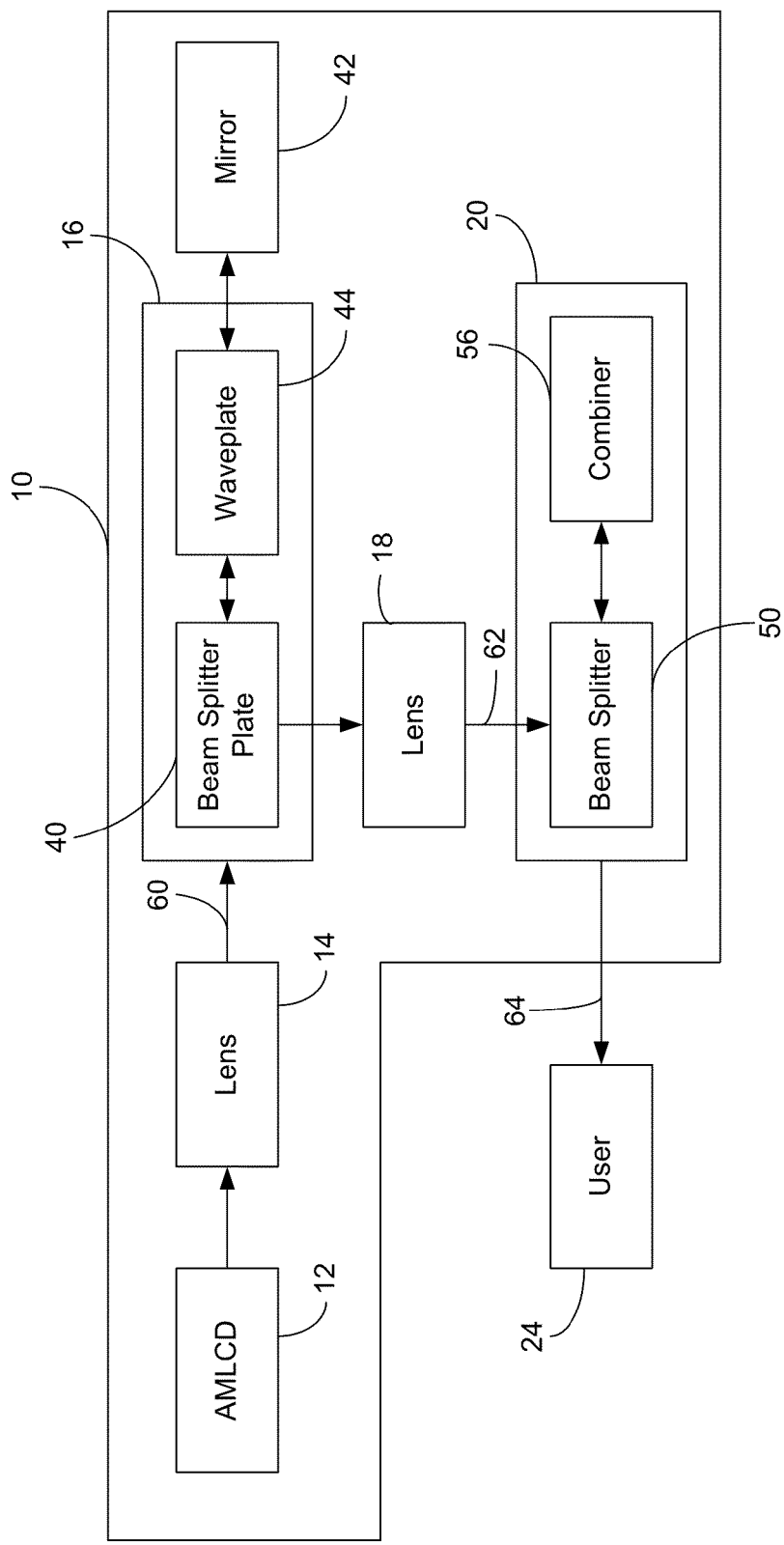
FIG. 1 is a general block diagram of a HUD in accordance with an exemplary embodiment of the present application.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, a head up display (HUD) system 10 is preferably configured for use in smaller cockpit environments and yet provides a wide field of view. System 10 preferably includes an image generating device, such as, a CRT display, an LED display, or an active matrix liquid crystal display (LCD) assembly 12.

Assembly 12 preferably provides images, symbols, information, data, etc. for viewing by a pilot or user 24. System 10 also includes optical components comprised of a lens 14, a polarizing beam splitter 16, a mirror 42, a lens 18, and a combiner assembly 20. Polarizing beam splitter 16 preferably includes a beam splitter plate 40 and a wave plate 44. Mirror 42 can include a mirror coating on a curved surface. Mirror 42 can be integrated within polarizing beam splitter 16 or can be a separate component. Preferably, polarizing beam splitter 16 has a dimension of 2.25 inches or less on each side, although other dimensions are possible depending upon design criteria. Combiner assembly 20 preferably includes a combiner 56 and a beam splitter 50. Beam splitter 50 can be embodied as a plate.

System 10 is preferably configured as a compact, wide field of view HUD without requiring off-axis components. Lens 14, polarizing beam splitter 16, mirror 42, lens 18, beam splitter 50, and combiner 56 preferably provide an optical system that behaves like a rotationally symmetric relaying and collimating optical system even though it is not rotationally symmetric in a strict sense. The rotational symmetry and use of optically powered reflectors allows the optical system to be very simple, compact, and inexpensive. The total field of view for the system 10 is 24×30 degrees. The total field of view could be much higher or lower depending upon design criteria and application requirements.

In a preferred embodiment, system 10 operates as an on-axis collimator and requires little optical correction to provide quality imagery. Lenses 14 and 18 preferably provide necessary optical correction. Lens 14, beam splitter 16, lens 18 and mirror 42 preferably provide a relatively simple catadioptric relay optical assembly which is compact for fitting into small cockpits without upper clear vision obscuration and yet enables easy stowage. System 10 preferably provides a wide field of view similar to conventional HUD approaches using much larger optics. System 10 can preferably be designed to provide greater than 3.5 inches of clearance from a head 68 of user 24 when in a cockpit environment.

Figure 2:
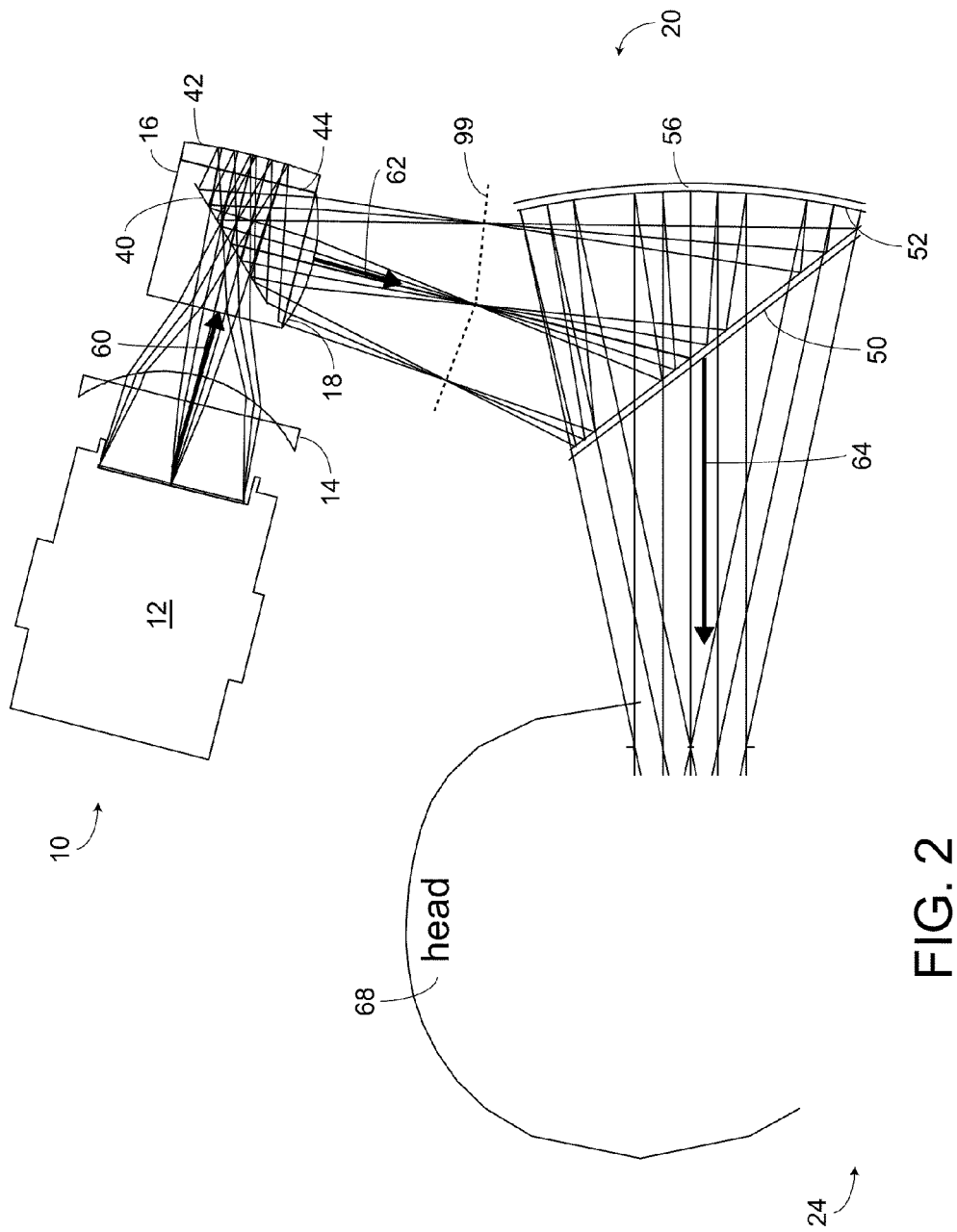
FIG. 2 is a drawing of the optical path for the system illustrated in FIG. 1 in accordance with an exemplary embodiment.

FIG. 2 is a drawing of the optical path for system 10 illustrated in FIG. 1 in accordance with an exemplary embodiment. With reference to FIGS. 1 and 2, LCD assembly 12 preferably provides information in the form of light at an optical axis 60 through lens 14 to polarizing beam splitter 16. Light is provided through beam splitter plate 40 through wave plate 44 to mirror 42. The light is reflected from mirror 42 through wave plate 44 to beam splitter plate 40.

Beam splitter plate 40 provides the light on optical axis 62. The light on optical axis 62 is focused to an intermediate image 99. Beam splitter plate 40 is preferably disposed at a 45 degree angle with respect to axis 60. The light from beam splitter plate 40 is provided through lens 18 to beam splitter 50. Beam splitter 50 can also be a polarizing beam splitter. The light striking beam splitter 50 is reflected to combiner 56. Combiner 56 is preferably a collimating combiner having a curved surface 52. Intermediate image 99 is preferably located at the focal point of combiner assembly 20.

Light from combiner 56 is provided along optical axis 64 to head 68 of user 24 as collimated light. Preferably, curved combiner 56 is placed directly in front of user or pilot's head 68. Such a design provides an on-axis system which avoids the complexities and expense associated with off-axis systems.

The light from combiner 56 is received by the eyes in the head 68 of pilot or user 24 along axis 64 through splitter 50. The light travels through splitter 50 after being reflected from curved surface 52 of combiner 56. Splitter 50 is preferably a flat plate disposed at an angle with respect to axis 64. Beam splitter 50 receives light along optical axis 62 from lens 18 and reflects the light to surface 52 of combiner 56. The angle between axis 62 and splitter 50 is dependent upon the cockpit constraints, and not necessarily upon optical performance limitations. An advantage of this degree of freedom is that it allows the optical design to be easily adapted to other cockpit geometries without requiring significant rework. Axis 64 is preferably perpendicular to the center of combiner 56 in order to preserve rotational symmetry in the optics.

Light from polarizing beam splitter plate 40 is received from assembly 12 through lens 14 along axis 60. The light from assembly 12 is preferably polarized. Lens 14 is embodied as a field flattener lens. Alternatively, a field flattener lens can be provided with assembly 12. Lens 18 is configured as a corrective lens. Collimating operations for system are preferably performed by the combination of combiner 56 and mirror 42. Lenses 14 and 18 or additional optical components can contribute to collimation by correcting the residual errors over the exit pupil and total field of view. Lenses 14 and 18, mirror 42, and any additional components may be spherical, aspherical, a Fresnel shape, and/or diffractive.

Mirror 42 can be any type of reflecting optical component. Mirror 42 can have a curved surface for focusing the light to intermediate image 99. The use of polarizing beam splitter 16 increases efficiency. Polarized light from axis 60 passes through beam splitter plate 40 and reflects from mirror 42. The polarized light passes through wave plate 44 twice such that the electric vector of the polarized light is rotated 90 degrees. Because the beam splitter plate 40 is polarization sensitive, the light from mirror 42 does not pass back through beam splitter plate 40 towards LCD assembly 12, but instead is reflected toward lens 18 along axis 62.

Lens 14, lens 18, mirror 42, and beam splitter plate 40 are positioned and configured to provide intermediate image 99 at the focal point of combiner assembly 20. Various adjustments to the dimensions, optical properties and placement of components can be made and still achieve the provision of image 99 at the focal point of combiner assembly 20.

In one embodiment, a wave plate is provided on surface 52 of combiner 56 to improve optical efficiency in the same manner as described above.

Figure 3:
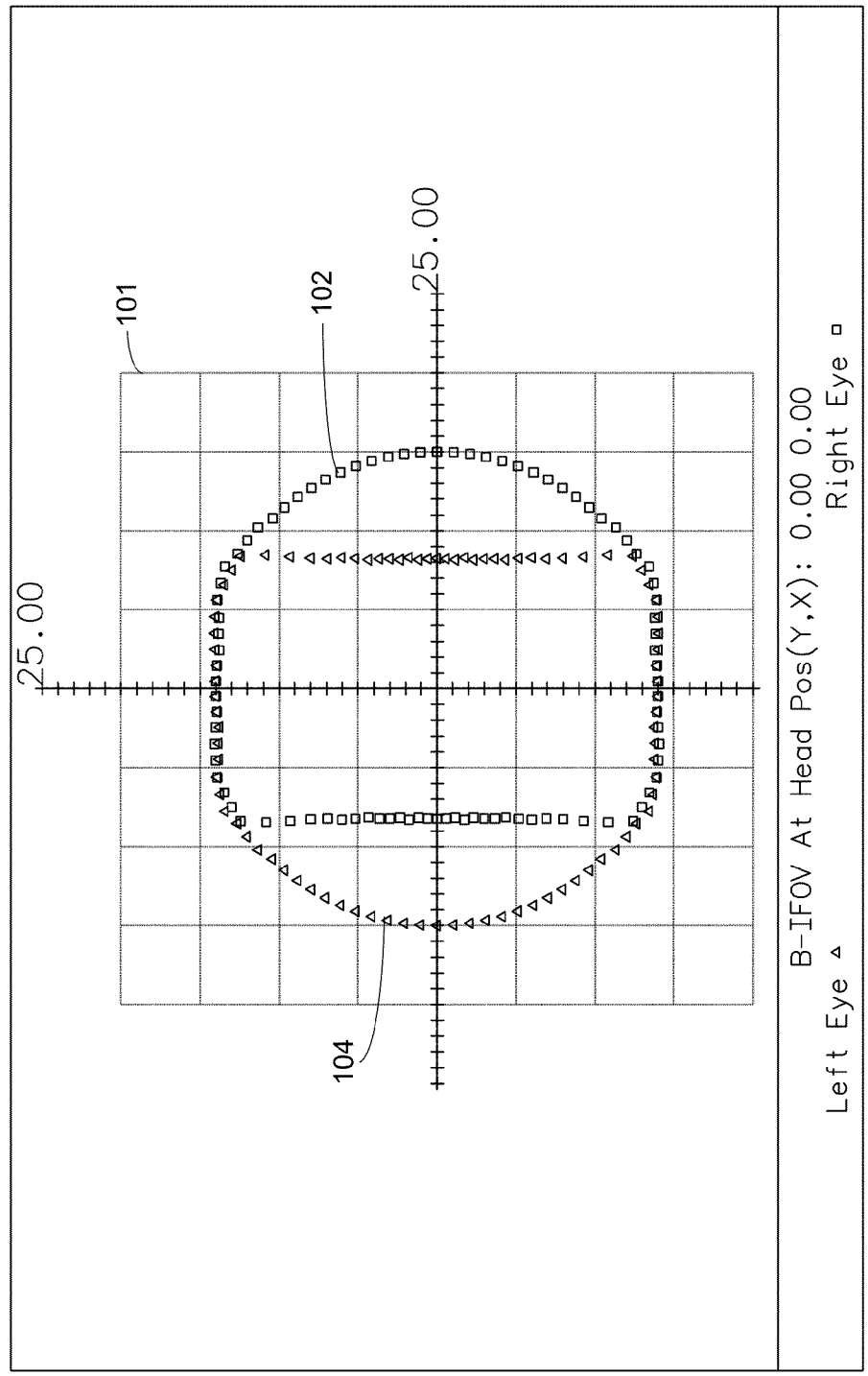
FIG. 3 is a drawing of field of view analysis at a normal head position for the HUD illustrated in FIG. 1 according to an exemplary embodiment.

With reference to FIG. 3, a field of view drawing 101 includes a right eye field of view 102 and a left eye field of view 104 at normal head position. At head position 0, 0 inches (e.g. the normal head position), the total field of view is 30×24 degrees.

Figure 4:
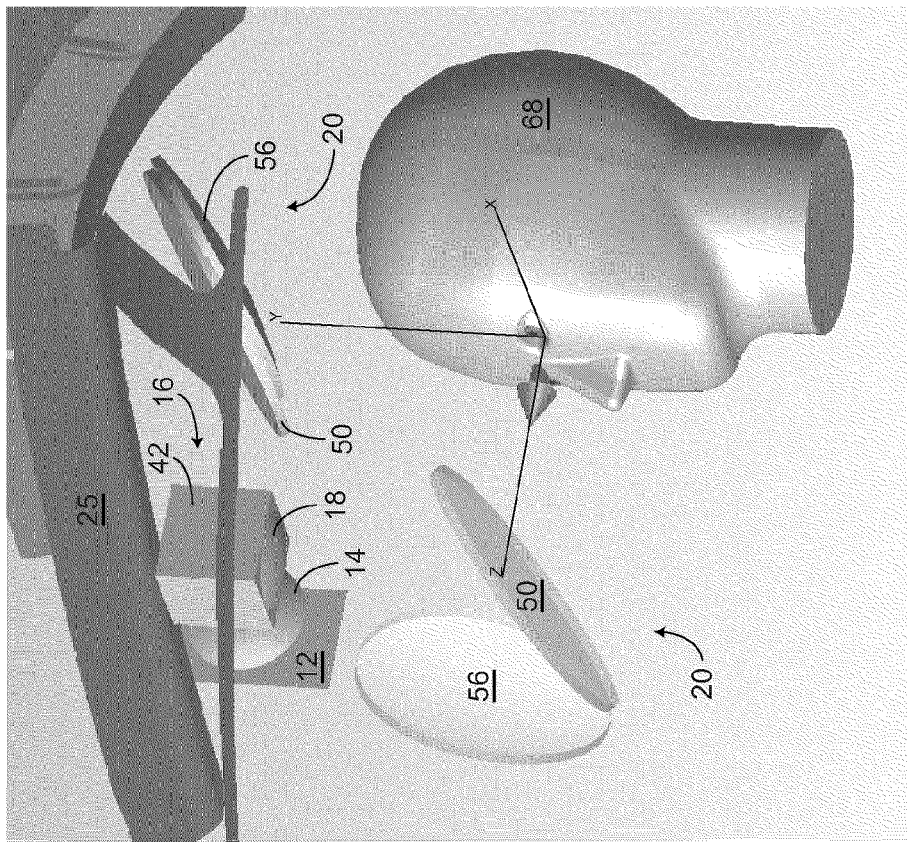
FIG. 4 is a perspective view of optical solids for the system illustrated in FIG. 1 from a front, left side showing the combiner assembly in a stowed position and an operational position.

With reference to FIG. 4, an optical solid drawing shows system 10 in a cockpit environment. Polarizing beam splitter 16 is cubic in shape and attached to a cockpit structure 25 of an aircraft. Assembly 12, lens 14, polarizing beam splitter 16, mirror 42 and lens 18 can be provided as a single assembly attached to a bracket, structure 25, or other part of the cockpit.

Combiner 56 is preferably hingeably attached to beam splitter 50 to form combiner assembly 20. Combiner assembly 20 is disposed directly in front of the pilot's eyes. (The distance between the eyes in head 68 of user 24 is preferably greater than 3 inches along optical axis 64.)

Figure 5:
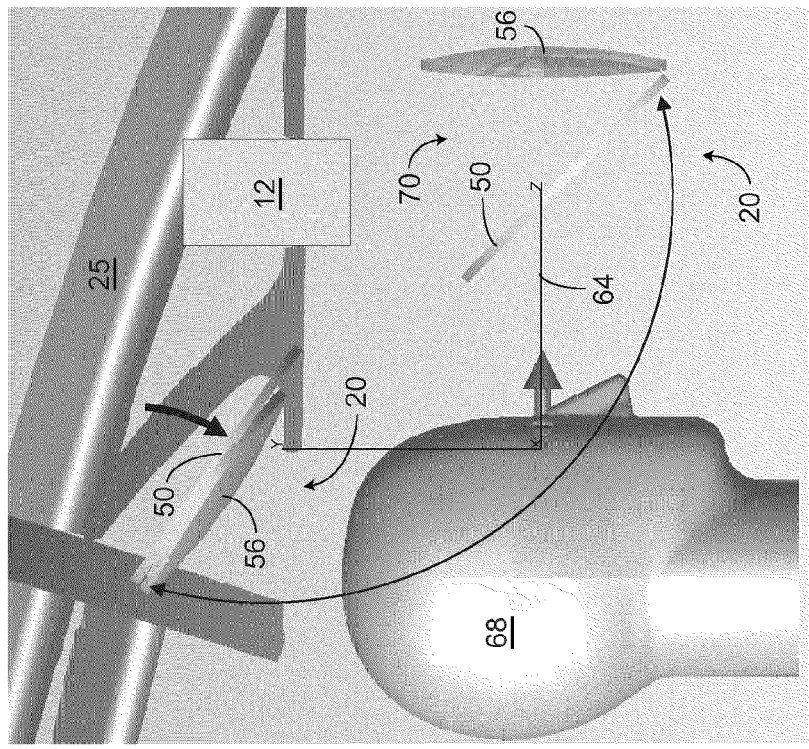
FIG. 5 is a planar right side view of optical solids for the system illustrated in FIG. 1, showing the combiner assembly in a stowed position and an operational position in accordance with still another exemplary embodiment.

With reference to FIG. 5, combiner 56 is hingeably attached to system 10 so that combiner assembly 20 can be folded up away from head 68. System 10 is attached to cockpit structure 25 of an aircraft, but can also be attached to the glare shield, instrument panel or other portion of the cockpit environment. Additionally, system 10 may be rotated any amount about axis 64 to take advantage of the optimal attachment points for a given aircraft design.

As shown in FIGS. 4 and 5, beam splitter 50 preferably folds into combiner 56 for convenient stowage of the entire combiner assembly 20 above head 68. Hinges, rotational couplings, or other pivotal coupling devices can be employed between beam splitter 50 and combiner 56. Multiple pivotable members or rotational couplings can be used to articulate between the stowed and operational position. The stowed position of combiner assembly 20 allows easier ingress and egress to and from the cockpit.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claims.

What is claimed is:

1. A head up display, comprising:
   an image source;
   a first lens,
   a polarizing beam splitter plate, wherein the first lens is disposed between the image source and the polarizing beam splitter plate;
   a wave plate;
   a focusing mirror;
   second lens;
   a second beam splitter, the second lens being disposed between the polarizing beam splitter plate and the second beam splitter, a first optical axis of the first lens being at an angle with respect to a second optical axis of the second lens; and
   a combiner having a curved partially reflective surface positioned to receive light from the second beam splitter.

2. The head up display of claim 1, wherein the focusing mirror is attached to the polarizing beam splitter.

3. The head up display of claim 1, wherein the focusing mirror has a curved surface, the focusing mirror providing an intermediate image at a focal point of the combiner.

4. The head up display of claim 1, wherein the image source is an active matrix liquid crystal display.

5. The head up display of claim 1, wherein a distance between a position for a pilot's eyes and the first beam splitter is greater than 3 inches.

6. The head up display of claim 1, wherein a distance between a position for a pilot's eyes and the combiner is greater than 3 inches.

7. The head up display of claim 1, wherein the second lens, the focusing mirror and the polarizing beam splitter are a single assembly.

8. The head up display of claim 1, wherein the combiner and first beam splitter can be folded together.

9. The head up display of claim 8, wherein the combiner and first beam splitter can be folded to a ceiling of an aircraft when the combiner and first beam splitter are folded together.

10. The head up display of claim 8, wherein the head up display has a total field of view of 24×30 or greater.

11. A method of providing information to a pilot, the method comprising:
    providing light associated with the information through a first lens and a polarizing beam splitter to a focusing mirror and providing the light from the focusing mirror through the polarizing beam splitter to a correcting lens; and
    providing the light from the correcting lens to a combiner via a polarizing beam splitter, wherein the combiner has a partially reflective surface positioned to receive the light from the first beam splitter.

12. The method of claim 11, wherein the light is focused to an intermediate image between the correcting lens and a second beam splitter.

13. The method of claim 12, wherein the second beam splitter is foldable into the combiner.

14. The method of claim 11, wherein the combiner is foldable.

15. The method of claim 11, wherein the combiner is greater than 3 inches from a pilot's eye position.

16. An optical system for a head up display including an image source, the optical system comprising:
    a first lens;
    a first beam splitter;
    a focusing mirror;
    a second lens;
    a second beam splitter; and
    a combiner, wherein the first beam splitter is disposed between the first lens and the mirror and second lens, wherein the second beam splitter is disposed between the second lens and the combiner, wherein the combiner has a curved partially reflective surface position to receive light from the second beam splitter.

17. The system of claim 16, wherein combiner is hingeably coupled to the second beam splitter.

18. The system of claim 16, wherein the first and second beam splitters are polarizing beam splitters.

19. The system of claim 16, wherein the combiner is configured for mounting to a ceiling.

20. The system of claim 17, wherein the combiner is configured for mounting to an instrument panel or glareshield.

* * * * *